United States Patent Office 3,321,625
Patented May 23, 1967

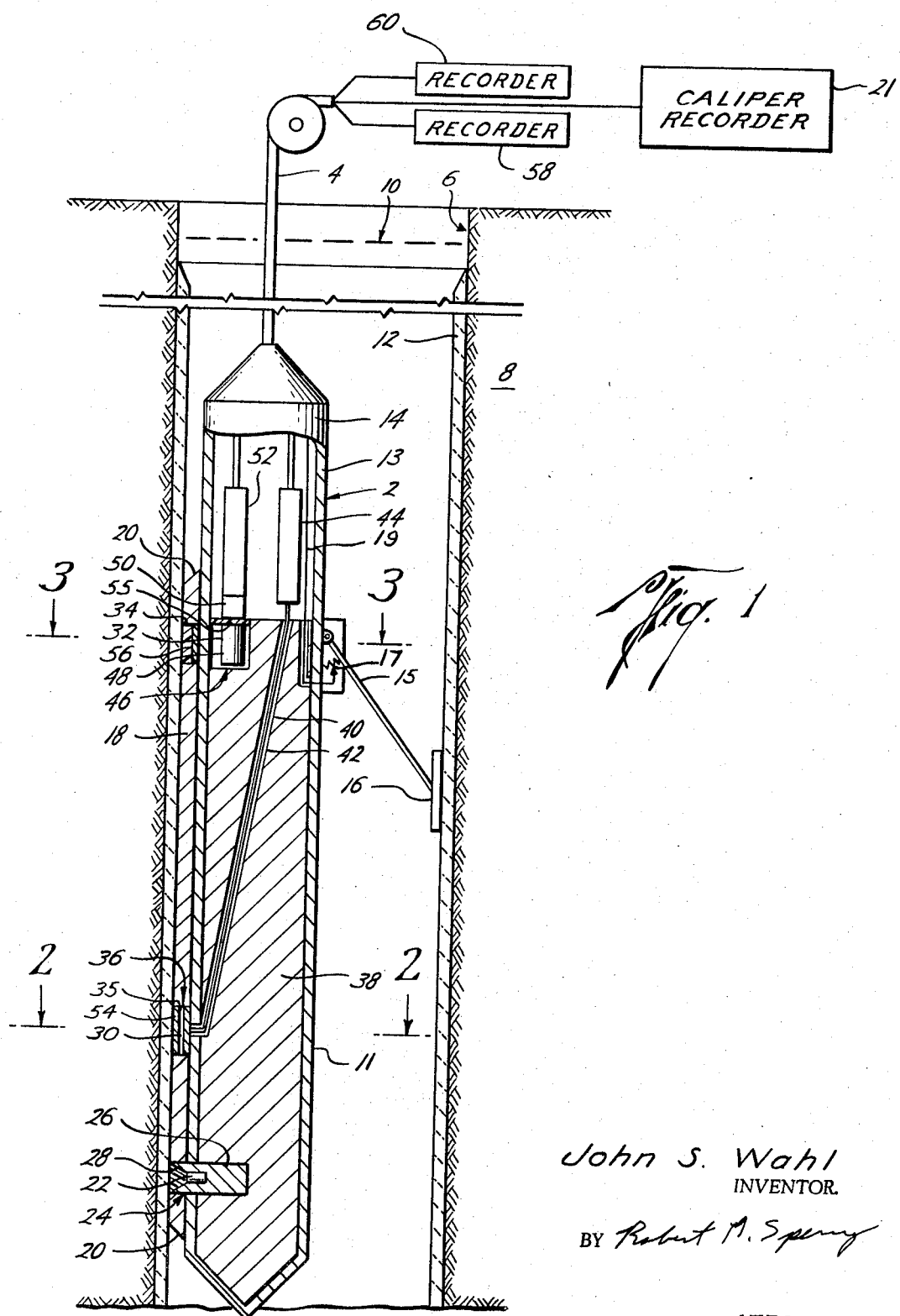

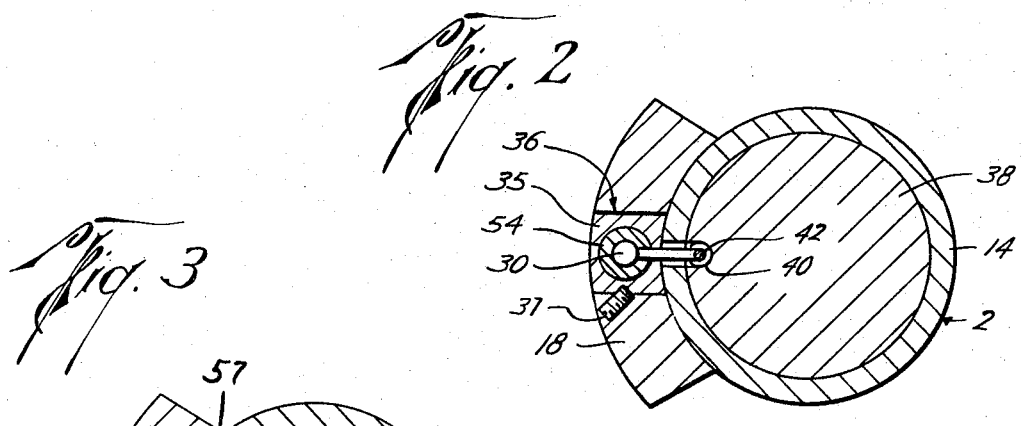
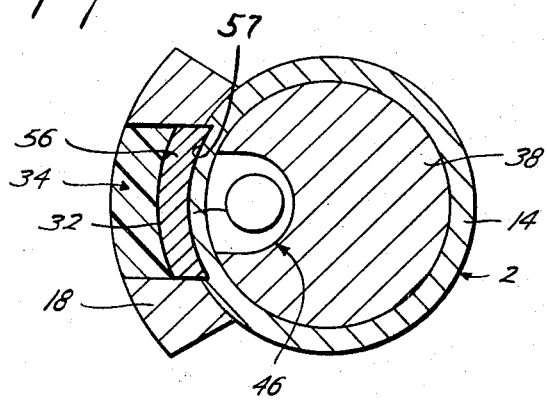
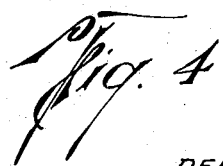
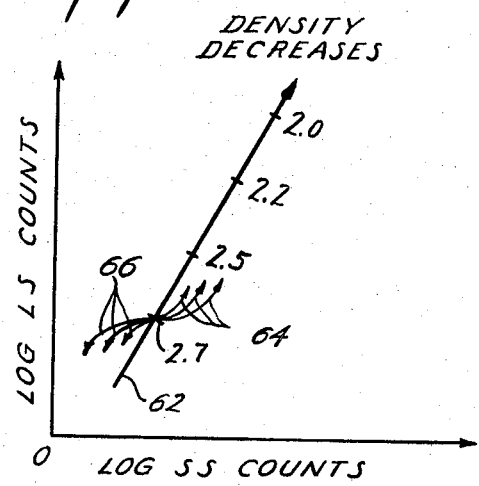
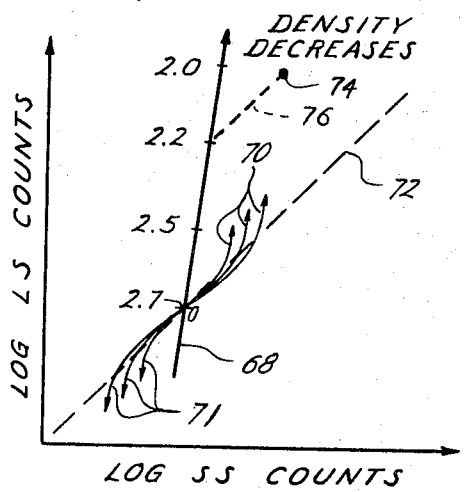
John S. Wahl
INVENTOR.

3,321,625
COMPENSATED GAMMA-GAMMA LOGGING TOOL USING TWO DETECTORS OF DIFFERENT SENSITIVITIES AND SPACINGS FROM THE SOURCE
John S. Wahl, Ridgefield, Conn., assignor to Schlumberger Technology Corporation, Houston, Tex., a corporation of Texas
Filed Dec. 10, 1962, Ser. No. 243,300
13 Claims. (Cl. 250—71.5)

This invention relates to radioactivity well logging and is specifically directed to novel apparatus for employing gamma rays to determine the densities of earth formations surounding a borehole.

It has previously been proposed that a useful log could be derived by irradiating the formations surrounds a borehole with gamma rays from a suitable source contained within the logging sonde, and by detecting gamma rays after they have been scattered in the formations. Such a log is proposed, for example, in U.S. Patent No. 2,944,148, issued July 5, 1960, to Johnson and Tittman. In making a log of this type, the gamma rays from the source interact with the electrons which are present in each atom of the formation, and the number and energy of the gamma rays which return to the gamma-ray detector will depend upon the density of the formation. Inasmuch as the electron density is very nearly proportional to the mass density for all constituents of geological formations, the foregoing method will depend primarily upon the average density of the formations encountered. This logging method is generally referred to as "gamma-gamma logging." Furthermore, it can be shown that if the density of the fluid filling the pore spaces of the formation is known, which is generally the case, the formation porosity can easily be calculated from the density of the formation.

The sondes employed for gamma-gamma logging are generally designed to minimize the effects of gamma-ray interactions occurring within the borehole itself. In addition, the sonde is eccentered and is pressed against the wall of the borehole to further reduce the borehole effects. While these precautions overcome many of the disadvantages of earlier gamma-gamma logs, there is still room for improvement.

One of the major problems encountered in gamma-gamma logging, heretofore, has arisen from the fact that drilling mud frequently becomes caked on the borehole wall. The density of the mudcake is generally different from the formation density. However, gamma rays from the source must pass through the mudcake in order to reach the formations, and must pass through the mudcake again in returning to the gamma-ray detector. As indicated above, the gamma-gamma logging methods of the prior art measure the average density of the formations encountered, and since the gamma rays must pass through the mudcake twice in passing from the source to the detector, it is apparent that the density of the mudcake will strongly affect the apparent density of the formations. This has resulted in a significant source of error in numerous gamma-gamma logs made heretofore.

In addition, where scintillation counters have been employed to detect the returning gamma rays, it has been difficult to provide shielding against extraneous gamma rays incident on the scintillation material from above, many of which will have been scattered within the borehole and will not have penetrated the formations. This has also been a significant source of error in prior gamma-gamma logs.

These disadvantages of prior art gamma-gamma logging systems are overcome with the present invention, and novel apparatus for gamma-gamma logging is provided whereby the effects of mudcake and extraneous radiation can be substantially overcome.

The advantages of the present invention are preferably attained by providing a novel gamma-gamma logging instrument having a gamma-ray source and two gamma-ray detectors spaced respective, but predetermined distances from the source so that one of said detectors is made primarily sensitive to gamma rays which have been scattered in the mudcake, while the other detector is made primarily sensitive to gamma rays which have been scattered in the formations. The outputs of these two detectors may then by compared to provide a log which accurately indicates the formation density.

If desired, suitable filters may be provided for the detectors to enhance the preferential sensitivity thereof. In addition, novel shielding means is provided for use with scintillation counters whereby a sheet of lead glass or the like is inserted between the scintillation material and the photomultiplier tube to preclude extraneous gamma rays from passing through the photomultiplier tube to strike the scintillation material.

Accordingly, it is an object of the present invention to provide improved apapratus for gamma-gamma logging.

Another object of the present invention is to provide novel apparatus for overcoming the effects of mudcake on gamma-ray density logs.

An additional object of the present invention is to provide novel means for shielding scintillation detectors against gamma rays incident thereon through the photomultiplier tube.

A further object of the present invention is to provide novel apparatus for gamma-ray density logging which yields information about the mudcake and unambiguous formation density information.

These and other objects and features of the present invention will become apparent from the following detailed description taken with reference to the figures of the accompanying drawings.

In the drawings:

FIG. 1 is a diagrammatic representation of a well-logging apparatus embodying the present invention;

FIG. 2 is a sectional view of the instrument of FIG. 1 taken on the line 2—2 thereof;

FIG. 3 is a sectional view of the instrument of FIG. 1 taken on the line 3—3 thereof;

FIG. 4 is a diagrammatic representation illustrating the relationship of the data of the instrument of FIG. 1 without compensation for mudcake composition; and FIG. 5 is a diagrammatic representation illustrating the relationship of the data of the instrument of FIG. 1 including compensation of mudcake composition.

In that form of the present invention chosen for purposes of illustration in the drawings, FIG. 1 shows a subsurface instrument 2 suspended by means of a cable 4 in a borehole 6 which penetrates the earth 8. The borehole 6 may be filled with fluid, such as oil, water, drilling mud, gas, or a combination of these, as indicated at 10, and in many instances, the walls of the borehole 6 will be coated with a mudcake, as indicated at 12.

As shown, the subsurface instrument 2 comprises a generally cylindrical, pressure-resistant housing 14, formed of steel or the like, having a detector portion 11 and an electronics portion 13. The instrument 2 is provided with decentralizing means, such as resiliently actuated arm 15 carrying pad 16, urging one side of the instrument toward the wall of the well to reduce the effects of borehole size and diameter. Preferably, the decentralizing means will also include means, such as rheostat 17, for providing a caliper log. A typical device for this purpose is disclosed in the copending application of D. F. Saurenman, Ser. No. 36,270, filed June 15, 1960, and assigned to the present assignee and now abandoned. Since the size of the borehole, as drilled, is usually known, the caliper log will provide a measure of the mudcake thickness. As hereinafter described, this measurement may be combined with the gamma-ray measurements to eliminate the effects of the mudcake and to provide an unambiguous indication of the formation density. In addition, the caliper log serves to reveal the location of caves and other irregularities in the borehole wall which may affect the density log. The signals from the caliper logging means 17 are preferably transmitted to the surface by means of conductor 19 and cable 4, and are indicated on a suitable caliper log recorder 21.

A wear-resistant skid 18, formed of steel, Hevimet, or the like, is provided on the side of the instrument which engages the wall and preferably has the ends thereof beveled, as seen at 20, to facilitate movement through the borehole. A gamma-ray source 22, preferably formed of cesium 137 or a like low-energy source, is mounted in a recess 24 which extends through the skid 18 and housing 14 in the detector portion 11 of the instrument 2, and is arranged substantially perpendicular to the axis of the instrument 2. The source 22 is preferably mounted a substantial distance, of the order of one-half inch to two inches, back from the outer end of the recess 24 and the balance of the recess is preferably filled with suitable shielding material 26, such as Hevimet which is substantially opaque to gamma rays, while a window 28 formed of a material which is transparent to gamma rays, such as epoxy resin, extends from the source 22 to the outer end of the recess 24. In this way, gamma rays from the source 22 are collimated and are directed into the wall of the well engaged by the skid 18.

It has been found that at very short source-to-detector spacings, of the order of one inch, the gamma-ray counting rate is directly related to the density of the adjacent formations. Thus, the higher the counting rate, the greater the density. However, at such short spacing, it is extremely difficult to shield the detector against gamma rays passing directly from the source to the detector through the instrument. Such gamma rays obviously provide no information about the formations and serve only to obscure the information contributed by those gamma rays which have penetrated the formations. By increasing the source-to-detector spacing, it is possible to provide more shielding between the source and detector and, hence, to reduce the number of direct gamma rays reaching the detector. On the other hand, as the spacing is increased, the sensitivity to density decreases until a point is reached where the detector is completely insensitive to density. The spacing at which this occurs is referred to as the "crossover distance." It has been found that the crossover distance is about three inches. As the source-to-detector spacing is increased beyond the crossover distance, the detector again becomes sensitive to density, and becomes more and more sensitive to density as the spacing is increased further. However, beyond the crossover distance the counting rate is inversely related to the density. Thus, the greater the density, the lower the counting rate. If the spacing is made too great, the counting rate will be too low to permit statistically accurate measurement while the instrument is being moved through the borehole at a reasonable speed.

It has also been found that, as the spacing is increased beyond the crossover distance, the depth of sampling is increased; i.e., as the source-to-detector spacing is increased, the detector becomes more sensitive to gamma rays which have penetrated more deeply into the formations. Unfortunately, when drilling mud becomes caked on the borehole wall, the gamma rays from the source must pass through the mudcake in order to reach the formations and must pass through the mudcake again in order to reach the detector. Since the density of the mudcake is generally different from that of the formations, the counting rate obtained by the detector is appropriate to some suitably weighted average of the densities of the mudcake and the formation behind it. Thus, if the mudcake density is lower than that of the formation, the apparent density derived from the counting rate will be too low. Conversely, if the mudcake density is greater than that of the formation, the apparent density derived from the counting rate will be too high. While the mudcake effect decreases with longer source-to-detector spacings, due to the greater depth of sampling, it is still an annoying and significant factor at any practical spacing.

To overcome these problems, the applicant has provided two gamma-ray detectors 30 and 32. Detector 30 is spaced longitudinally along skid 18 moderately beyond the crossover distance and is mounted immediately adjacent its wear face in a steel capsule 35 which is removably secured in a longitudinal recess 36 formed in the skid 18 outside of housing 14, as by set screws 37 or the like. In contrast, detector 32 is spaced a large distance beyond the crossover distance; is mounted within the housing 14 recessed a short distance, about one-to-two inches, from the wall-engaging face; and is provided with a collimating window 34 formed of a gamma-ray transparent material, such as aluminum, fiber glass, or an epoxy resin, which may extend through housing 14 and skid 18.

To prevent gamma rays from passing directly from source 22 to the detectors 30 and 32 and to reduce borehole effect, the detector portion 11 of housing 14 is filled with shielding material 38, such as copper or lead, which is substantially opaque to gamma rays. As seen in FIGS. 1 and 3, a recess 46 is formed in the shielding material 38 adjacent the wall-engaging face of the instrument 2 to receive detector 32 and the collimating window 34. In addition, a channel 40 is provided extending through the detector portion 11 of the instrument 2 and inclined with respect to the axis of the instrument 2 to form a conduit for passage therethrough of suitable conductors 42 for connecting detector 30 to its associated electronic circuitry 44.

With the apparatus thus described, detector 30 will have a relatively shallow depth of sampling and no collimation. Consequently, detector 30 will be strongly affected by gamma rays which have been scattered in the mudcake. On the other hand, detector 32 will have a substantially greater depth of sampling and is collimated. Therefore, detector 32 will be primarily affected by gamma rays which have been scattered in the formations and the mudcake effect will be minimized. By combining the signals from detectors 30 and 32, in the manner hereinafter described, the mudcake effect is completely eliminated and a density log is provided which accurately and reliably indicates the density of the formations.

Obviously, if the detectors 30 and 32 are spaced too closely together, their responses will be substantially identical and the advantage of providing two detectors will be minimized. On the other hand, if the detectors are spaced too far apart, it will be found that either detector 30 must be placed so close to the source 22 that it is difficult to provide adequate shielding against direct radiation, or detector 32 must be placed so far from the source 22 that the counting rate is undesirably low. It has been found that optimum results are obtained when detector 32 is spaced from source 22 a distance approximately two-to-three times greater than the spacing of detector 30. Specifically, detector 30 is preferably spaced more than five inches, but less than nine inches from source 22, while detector 32 is preferably spaced twelve-to-twenty-four inches from source 22.

As shown in FIGS. 1, 2, and 3, detector 30 is a Geiger-Müller counter, while detector 32 is a scintillation counter having a scintillation material 48 and a photomultiplier tube 50. However, it will be obvious that any type of gamma-ray detector which will establish suitable electrical signals in response to detection of incident gamma rays could be substituted for either or both of the detectors shown.

One problem which has plagued users of scintillation detectors in prior art well-logging instruments has been the fact that an optical coupling must be provided between the scintillation material and the photomultiplier tube. This optical coupling must, obviously, be formed of a material which is transparent to light of the frequency emitted by the scintillation material. Unfortunately, all of the materials heretofore suggested for such optical couplings have also been transparent to nuclear radiations, such as gamma rays or neutrons. Thus, while it has been common practice to provide shielding material which is opaque to nuclear radiations about most sides of scintillation detectors to prevent unwanted nuclear radiations from reaching the scintillation material, it has not been possible with coupling materials utilized heretofore to provide shielding to prevent such nuclear radiations as gamma rays from reaching the scintillation material by passing through the photomultiplier tube. However, it has been found that nuclear radiations incident on the scintillation material through the photomultiplier tube generally provide little, if any, useful information and, on the contrary, tend to obscure the information provided by those nuclear radiations which are incident on the scintillation material from preselected directions, such as by passing through collimating windows formed in the shielding material.

In accordance with the present invention, this problem is overcome by interposing between the scintillation material and the photomultiplier tube a shielding means 55 which is transparent to light pulses from the scintillation material 48, but which is substantially opaque to nuclear radiations. Such shielding means is preferably formed of a material, such as glass or a suitable plastic, which is transparent to light pulses emitted by the scintillation material 48 and which contains a relatively large proportion of a material which is opaque to nuclear radiations, such as lead or cadmium for gamma-ray shielding, or boron for neutron shielding. As a specific example, a sheet of glass containing 60% by weight of lead oxide has been found to be entirely satisfactory for use as the shielding means 55.

As shown in FIG. 1, the signals from detector 30 are supplied to suitable electronic circuits, indicated by block 44, while the signals from detector 32 are supplied to electronic circuits, indicated by block 52. The electronic circuits, indicated by blocks 44 and 52, serve to suitably process the signals from detectors 30 and 32 for transmission to the surface of the earth and to apply the processed signals to the cable 4. The specific circuitry included in the blocks 44 and 52 depends upon the type of detectors employed and the manner in which the signals are to be transmitted to the surface of the earth. Such circuitry is conventional and will be obvious to those skilled in the art. Typically, blocks 44 and 52 will include such circuits as emitter followers, discriminators, amplifiers, scale of four circuits, and blocking oscillators.

At the surface, the signals from short-spaced detector 30 are passed to a suitable recorder 58 where the signals are recorded as a function of depth. Similarly, the signals from long-spaced detector 32 are passed to recorder 60 where the signals are recorded as a function of depth. As has been described, the short-spaced detector 30 is primarily responsive to the density of the mudcake, while long-spaced detector 32 is primarily responsive to the density of the formation.

If desired, the circuits of the surface equipment, indicated as recorders 58 and 60 in FIG. 1, may include additional amplifiers, counting rate meters, and other conventional electronics. Moreover, while separate recorders 58 and 60 have been shown, it will be apparent to those skilled in the art that similar results could be obtained by supplying the signals of detectors 30 and 32 to respective galvanometers of a multiple trace recorder.

With the apparatus thus described, it will be found that in the absence of mudcake the logarithms of the responses of the two detectors 30 and 32 will bear a linear relationship to each other, and will be inversely related to the density of the formations. This is shown by arrow 62 in FIG. 4. Where mudcake is present, the responses of detectors 30 and 32 will be affected by the thickness, composition, and density of the mudcake. Thus, the presence of mudcake will cause the plotted point for any given formation to be displaced from the arrow 62. Where the mudcake density is less than that of the formation, the data point will be displaced upward and to the right, as indicated by arrows 64, each of which represents the curve for a mudcake of a respective composition and density. Where the mudcake density is greater than that of the formation, the data point will be displaced downward and to the left, as indicated by arrows 66. Should the mudcake be so thick that gamma rays from source 22 could not penetrate to the formations at all, the curves, indicated by arrows 64 and 66, would return to arrow 62 at points corresponding to the respective densities of the mudcakes. However, mudcakes of such thickness are rarely, if ever, encountered in actual practice, typically being less than one-half inch thick.

The shape of the specific arrow 64 or 66, to which the plotted data point relates, will be determined by the composition of the mud forming the mudcake, as well as the density. While the gamma rays from source 22 travel to the detectors 30 and 32 primarily as a result of Compton scattering, a significant number of gamma rays undergo photoelectric interactions in the formations and are strongly affected by the atomic number of the elements through which they pass. Because the gamma rays must pass through the mudcake in travelling from the source to the formations and, again, in travelling from the formations to the detectors, the chemical composition of the mud will, obviously, have a significant effect, especially upon those gamma rays which have undergone photoelectric interactions in the mudcake. However, most drilling muds are commercial items whose composition is known and, in any event, the composition can be determined. As shown in FIG. 4, the arrows 64 and 66 intersect the zero mudcake arrow 62 at a value of 2.7. This indicates that the true formation density is 2.7. At any other value of formation density, a similar family of curves may be drawn. Thus, if desired, a plurality of charts may be provided, each showing the appropriate curve corresponding to a respective one of the arrows 64 and 66, and each providing the correction required for various thicknesses of mudcake of a respective density and composition. Consequently, by selecting the appropriate chart and plotting the data point indicated by recorders 58 and 60, the operator can rapidly and accurately determine the true formation density.

The thickness of the mudcake will determine the location of the plotted point along the appropriate curve. Consequently, as discussed above, where the composition of the mud is unknown, the mudcake thickness may be determined by comparing the caliper measurement made by pad 16 with the borehole diameter indicated on the driller's log. This, together with the mudcake density measurement from detectors 30 and 32, will generally define a point which will lie on only one of the mudcake curves—the one corresponding to the composition of the mudcake in question—and thus will enable the operator to select the appropriate curve.

It has also been found that by appropriately selecting the spacing and sensitivity of the detectors 30 and 32, the detectors may be made substantially insensitive to variations in mudcake composition and to matrix effects. Thus, for any given spacing between the detectors, there is a particular ratio of detector sensitivities which will produce optimum results. The term "detector sensitivity" is used here to refer to the ratio of the detector counting rate to the number of gamma rays incident on the detector. Conversely, for any given ratio of detector sensitivities there is a particular spacing which will provide optimum results. These factors are inversely related so that as the ratio of detector sensitivities is increased, the spacing between the detectors should be decreased, and vice versa. However, as indicated above, the long-spaced detector should still be spaced from the source a distance in the range of two-to-three times that of the short-spaced detector. In the preferred form of the invention, the long-spaced detector 32 has a sensitivity which is between 100 and 1000 times the sensitivity of the short-spaced detector 30. For this range of sensitivities, it has been found that optimum results are obtained with detector 32 spaced from source 22 a distance about two and one-half times the spacing of detector 30. Specifically, detector 30 is preferably spaced seven inches from source 22, while detector 32 is spaced 16 inches from source 22.

Although, as noted above, gamma rays travel from the source 22 to the detectors 30 and 32 primarily as a result of Compton scattering, some gamma rays will also be scattered as a result of the photoelectric interactions with K-level electrons of the atoms of the mudcake and formations. Such photoelectric interactions are substantially unaffected by density, but are directly proportional to the atomic number of the elements with which the gamma rays interact and are inversely proportional to the energy of the gamma rays. Since gamma rays lose energy as a result of each interaction, regardless of the type of interaction, the effects of the photoelectric interactions will become increasingly significant and tend to obscure the density information provided by the Compton scattered gamma rays. For the elements normally encountered in borehole logging, it has been found that gamma rays having energies of about 50 kev. are about equally affected by the Compton and photoelectric effects, while at lower energies the photoelectric effect predominates. Accordingly, the insensitivity of detectors 30 and 32 to mudcake composition and matrix effects may be enhanced by providing suitable filters 54 and 56 for the detectors 30 and 32, respectively, which are preferably formed selectively to absorb all gamma rays incident thereon having energies less than 50 kev. but to pass gamma rays of higher energy.

Since the energy of the gamma rays decreases exponentially as the distance from the source increases, the intensity of low-energy gamma rays, for example, gamma rays having energies less than 50 kev. in the vicinity of detector 32 will be substantially greater than the intensity of gamma rays of similar energy in the vicinity of detector 30. On the other hand, the intensity of the gamma rays absorbed by a filter is defined by the equation $$I = I_0 e^{-\mu dx}$$

where $I_0$ is the intensity of the gamma rays incident on the filter, $e$ is the base of the natural logarithmic systems; $\mu$ is the photoelectric absorption coefficient of the filter for gamma rays of the energy to be absorbed by the filter; and $dx$ is the thickness of the filter. It has been found that at the source-to-detector spacings described above for detectors 30 and 32, the filter 56 for the long-spaced detector 32 should have approximately two-to-three times the effective absorption of the filter 54 for the short-spaced detector 30. In the preferred embodiment, the filter 54 for detector 30 is preferably a sleeve surrounding the detector 30 within the capsule 35 and formed of silver or cadmium having a thickness of about .070 inch. In contrast, filter 56 for detector 32 is preferably a disc formed of silver or cadmium of about .150 inch thickness mounted in the window 34 out of wearing contact with the borehole wall. As shown in FIG. 3, the thickness of the pressure housing 14 is preferably reduced adjacent window 34, as indicated at 57, so that photoelectric absorption by the housing will be negligible. In the alternative, the effective absorption of the housing 14 may be determined and the thickness of filter 56 may be reduced appropriately to provide the desired filtering.

When the low-energy gamma rays are thus excluded and the proper detector spacing and sensitivity ratios are chosen, as described above, it will be found that the logarithms still bear a linear relationship to each other in the absence of mudcake, as indicated by arrow 68 in FIG. 5. However, where mudcake is present, it will be found that the mudcake curves, for any given formation density, will be substantially coextensive for almost all mudcake compositions and thicknesses which are likely to be encountered and will intersect the zero mudcake arrow 68 at an angle of approximately 45 degrees, as indicated by arrows 70 and 71.

Accordingly, the operator may assume the mudcake curves 70 and 71 for any given value of formation density to be a straight line, as indicated by dashed line 72, crossing the zero mudcake arrow 68 at an angle of 45 degrees. The operator can then readily obtain a close approximation of the value of the formation density by plotting a point, such as point 74, from the data provided by recorders 58 and 60 of the apparatus of FIG. 1 and by drawing a straight line, such as dotted line 76, passing through the plotted point 74 and extending parallel to dashed line 72. The point where the line 76 intersects the arrow 68 will indicate the density of the formation represented by the plotted point 74. One major advantage of this method of interpreting the data is that it can be accomplished quickly and easily by the operator at the well site and, consequently, can provide immediate information for the well owners.

In addition, numerous other variations and modifications may obviously be made without departing from the invention. Accordingly, it should be clearly understood that the forms of the invention described above and shown in the figures of the accompanying drawings are illustrative only and are not intended to limit the scope of the invention.

What is claimed is:
1. Apparatus for determining the density of formations surrounding a borehole; said apparatus comprising a subsurface instrument adapted for traversal through a borehole; means urging one side of said instrument into engagement with the wall of the borehole; a gamma-ray source mounted in said instrument adjacent said one side; first gamma-ray detector means mounted longitudinally of said instrument immediately adjacent said one side and spaced five-to-nine inches from said source; second gamma-ray detector means mounted in said instrument adjacent said one side and spaced twelve-to-twenty-four inches from said source; shielding material substantially opaque to gamma rays disposed about said detectors to make said detectors preferentially sensitive in the direction of said one side of said instrument; shielding means substantially opaque to gamma rays disposed about said source to direct gamma rays from said source primarily toward said one side of said instrument; and means for recording indications which are a function of signals derived from said detectors.

2. Apparatus for determining the density of formations surrounding a borehole; said apparatus comprising a subsurface instrument adapted for traversal through a borehole; means urging one side of said instrument into engagement with the wall of the borehole; a gamma-ray source mounted in said instrument adjacent said one side; first gamma-ray detector means mounted longitudinally of said instrument immediately adjacent said one side and spaced about seven inches from said source; second gamma-ray detector means mounted in said instrument adjacent said one side and spaced about sixteen inches from said source, said second detector means having a sensitivity about 100-to-1000 times greater than that of said first detector; shielding means substantially opaque to gamma rays disposed about said detectors to make said detectors preferentially sensitive in the direction of said one side of said instrument; shielding means substantially opaque to gamma rays disposed about said source to direct gamma rays from said source primarily toward said one side of said instrument; and means for recording indications which are a function of signals derived from said detectors.

3. Apparatus for determining the density of formations surrounding a borehole; said apparatus comprising a subsurface instrument adapted for traversal through a borehole; means for urging one side of said instrument into engagement with the wall of the borehole; a gamma-ray source mounted in said instrument and recessed about one-half inch from said one side; first gamma-ray detector means mounted in said instrument immediately adjacent said one side and spaced a predetermined distance of about 7 inches from said source; second gamma-ray detector means mounted in said instrument and recessed approximately one-to-two inches from said one side, said second gamma-ray detector means being spaced from said source a distance substantially greater than said predetermined distance; shielding material substantially opaque to gamma rays surrounding said source and said second detector and disposed about said first detector except adjacent said one side of said instrument; collimating windows substantially transparent to gamma rays formed in said shielding material and providing communication for said source and said second detector, respectively, with said one side of said instrument, and means for recording indications which are a function of signals derived from said detectors.

4. Apparatus for determining the density of formations surrounding a borehole; said apparatus comprising a subsurface instrument adapted for traversal through a borehole; means for urging one side of said instrument into engagement with the wall of the borehole; a gamma-ray source mounted in said instrument and recessed a substantial distance from said one side; a pressure capsule and first gamma-ray detector means mounted therein longitudinally of said instrument immediately adjacent said one side and spaced about five-to-nine inches from said source; second gamma-ray detector means mounted in said instrument and recessed approximately one-to-two inches from said one side, said second gamma-ray detector means being spaced approximately twelve-to-twenty-four inches from said source; a shielding material substantially opaque to gamma rays surrounding said source and said second detector and disposed about said first detector except adjacent said one side of said instrument; collimating windows substantially transparent to gamma rays formed in said shielding material and providing communication for said source and said second detector, respectively, with said one side of said instrument; and means for recording indications which are a function of signals derived from said detectors.

5. Apparatus for determining the density of formations surrounding a borehole; said apparatus comprising a subsurface instrument adapted for traversal through a borehole; means for urging one side of said instrument into engagement with the wall of the borehole; a gamma-ray source mounted in said instrument and positioned adjacent said one side; first gamma-ray detector means mounted in said instrument adjacent said one side and spaced a predetermined distance from said source, said predetermined distance being greater than the crossover distance; second gamma-ray detector means mounted in said instrument adjacent said one side and spaced from said source a distance substantially greater than said predetermined distance; filter means substantially opaque selectively to those gamma rays which have energies less than about 50 kev. interposed between each of said detectors and said one side of said instrument; shielding means substantially opaque to gamma rays disposed about said source and both of said detectors except adjacent said one side of said instrument; and means for recording indications which are a function of signals derived from said detectors.

6. Apparatus for determining the density of formations surrounding a borehole; said apparatus comprising a subsurface instrument adapted for traversal through a borehole; means for urging one side of said instrument into engagement with the wall of the borehole; a gamma-ray source mounted in said instrument and recessed a substantial distance from said one side; first gamma-ray detector means mounted in said instrument immediately adjacent said one side and spaced a predetermined distance of about five-to-nine inches from said source; second gamma-ray detector means mounted in said instrument and recessed approximately one-to-two inches from said one side, said second gamma-ray detector means being spaced from said source a distance substantially greater than said predetermined distance; shielding material substantially opaque to gamma rays surrounding said source and said second detector and disposed about said first detector except adjacent said one side of said instrument; collimating windows substantially transparent to gamma rays formed in said shielding material and providing communication for said source and said second detector, respectively, with said one side of said instrument; means for excluding signals corresponding to gamma rays having energies less than about 50 kev. from the outputs of said detectors; and means for recording indications which are a function of signals derived from said detectors.

7. Apparatus for determining the density of formations surrounding a borehole; said apparatus comprising a subsurface instrument adapted for traversal through a borehole; means urging one side of said instrument into engagement with the wall of the borehole; a gamma-ray source mounted in said instrument adjacent said one side; first gamma-ray detector means mounted in said instrument adjacent said one side and spaced about seven inches from said source; second gamma-ray detector means mounted in said instrument adjacent said one side and spaced about sixteen inches from said source, said second detector having a sensitivity about 100-to-1000 times greater than that of said first detector, said detectors being capable of establishing electrical signals in response to detection of incident gamma rays; shielding material substantially opaque to gamma rays disposed about said detectors to make said detectors preferentially sensitive in the direction of said one side of said instrument; shielding material substantially opaque to gamma rays disposed about said source to direct gamma rays from said source primarily toward said one side of said instrument; filter means substantially opaque to gamma rays having energies less than about 50 kev. interposed between said detectors and said one side of said instrument; and means for recording indications which are a function of signals derived from said detectors.

8. A radiation detector for detecting gamma rays selectively with respect to direction comprising scintillation means for emitting light pulses in response to incident gamma radiation; photoelectric means for receiving light pulses from said scintillation means and for establishing electrical signals indicative of said light pulses, and shielding means interposed between said scintillation means and said photoelectric means; said shielding means being substantially opaque to gamma radiation directed toward said scintillation means through said photoelectric means and substantially transparent to light pulses emitted by said scintillation means.

9. A radiation detector for detecting incident radiation selectively with respect to direction comprising scintillation means for emitting light pulses in response to incident radiation; photoelectric means for receiving light pulses from said scintillation means and for establishing electrical signals indicative of said light pulses; and a sheet of lead glass interposed between said scintillation means and said photoelectric means.

10. Apparatus for determining the density of formations surrounding a borehole; said apparatus comprising a subsurface instrument adapted for traversal through a borehole; means for urging one side of said instrument into engagement with the wall of the borehole; a gamma-ray source mounted in said instrument and positioned adjacent said one side; first gamma-ray detector means mounted in said instrument adjacent said one side and spaced a predetermined distance of about 5–9 inches from said source; second gamma-ray detector means mounted in said instrument adjacent said one side and spaced from said source a distance greater than said predetermined distance, said second detector including a scintillation material for emitting light pulses in response to detection of gamma rays and photoelectric means for receiving said light pulses and establishing electrical signals corresponding to said light pulses; first shielding means substantially opaque to gamma rays disposed about said source and both of said detectors except adjacent said one side of said instrument; second shielding means substantially opaque to gamma rays and substantially transparent to said light pulses interposed between said scintillation material and said photoelectric means; and means for recording indications which are a function of signals derived from said detectors.

11. Apparatus for determining the density of formations surrounding a borehole; said apparatus comprising a subsurface instrument adapted for traversal through a borehole; a radiation source which emits gamma rays mounted in said instrument; a radiation detector mounted in said instrument and spaced a predetermined distance from said soure; said radiation detector including a scintillation material for emitting light pulses in response to gamma radiation and photoelectric means for receiving said light pulses and establishing electrical signals corresponding to said light pulses; first shielding means substantially opaque to said radiation interposed between said source and said detector to protect said detector against direct radiation from said source, said first shielding means further surrounding said scintillation material except in the direction of said photoelectric means and in a direction laterally of said instrument from which gamma radiation is to be received; second shielding means substantially opaque to said radiation and substantially transparent to said light pulses interposed between said scintillation material and said photoelectric means; and means in said instrument for transmitting to the surface indications which are a function of the signals derived from said detector.

12. Apparatus for determining the density of formations surrounding a borehole comprising a subsurface instrument adapted for traversal through a borehole; means for urging one side of said instrument into engagement with the wall of the borehole; a gamma ray source mounted in said instrument and positioned adjacent said one side; first gamma ray detector means mounted in said instrument immediately adjacent said one side and spaced about 5–9 inches from said source; second gamma ray detector means mounted in said instrument recessed from said one side and spaced from said source a distance substantially greater than said predetermined distance; filter means substantially opaque to gamma rays having energies less than about 50 kev. interposed between each of said detectors and said one side of said instrument and operative to minimize the sensitivity of said detectors to the composition of the formation matrix and of any mudcake formed on the borehole wall adjacent said one side of said instrument; shielding means substantially opaque to gamma rays disposed about said source and both of said detectors except adjacent said one side of said instrument; and means responsive to signals derived from said detectors for recording indications from which the density of said formations may be determined substantially free from the effect of varying mudcake thickness, density and composition.

13. A subsurface instrument as defined in claim 4 wherein said capsule contains a cylindrical filter substantially opaque selectively to gamma rays having energies less than about 50 kev.

References Cited by the Examiner
UNITED STATES PATENTS

| | | | |
|---|---|---|---|
| 2,469,461 | 5/1949 | Russell | 250—83.6 |
| 2,727,155 | 12/1955 | Herzog et al. | 250—83.6 |
| 2,747,105 | 5/1956 | Fitzgerald et al. | 250—108 |
| 2,923,824 | 2/1960 | Martin et al. | 250—71.5 |
| 2,944,148 | 7/1960 | Johnson et al. | 250—71.5 |
| 3,012,145 | 12/1961 | Erion et al. | 250—71.5 X |
| 3,030,509 | 4/1962 | Carlson | 250—71.5 |
| 3,038,075 | 6/1962 | Youmans | 250—83.6 X |

ARCHIE R. BORCHELT, *Primary Examiner.*

RALPH G. NILSON, *Examiner.*